UNITED STATES PATENT OFFICE.

BENNO HOMOLKA, OF FRANKFORT-ON-THE-MAIN, GERMANY, ASSIGNOR TO THE FARBWERKE, VORMALS MEISTER, LUCIUS & BRÜNING, OF HÖCHST-ON-THE-MAIN, GERMANY.

BLUE BASIC DYE AND PROCESS OF MAKING SAME.

SPECIFICATION forming part of Letters Patent No. 649,728, dated May 15, 1900.

Application filed February 28, 1899. Serial No. 707,189. (Specimens.)

*To all whom it may concern:*

Be it known that I, BENNO HOMOLKA, Ph. D., a citizen of the Empire of Austria-Hungary, residing at Frankfort-on-the-Main, Germany, have invented certain new and useful Improvements in the Manufacture of Blue Basic Dyestuffs Soluble in Water, of which the following is a specification.

In the American Patent No. 524,254 and the German Patents Nos. 85,932, 91,721, 92,015, and 95,483 have been described a series of peculiar blue dyestuffs soluble in water, obtained by the action of diazotized safranin upon beta-naphthol, molecular quantities of both components being employed. These dyestuffs are generally known under the name of "safranin-azo-naphthols."

I have found that by the action of beta-naphthol upon diazotized safranin very valuable blue dyestuffs readily soluble in water may be obtained if two molecules of a diazotized safranin and one molecule of beta-naphthol are employed in a neutral slightly-acid or ammoniacal solution.

As primary material used in my process I recommend the technical safranin known in the market as "safranin G," "safranin T," "safranin G extra," "safranin A N extra," "safranin G. G. S.," "safranin concentrated," &c., and which is obtained by oxidation of a molecular mixture of paratoluylenediamin, ortho-toluidin, and anilin or toluidin. (*Vide* G. Schulz and P. Julius, *Tabellarische Uebersicht der Kunstl. Organ. Farbst.*, Berlin, 1897, p. 182.) However, with the same result may be employed the phenosafranin obtained by oxidation of a mixture of paraphenylenediamin and anilin, (*Ber. der Deutsch. Chem. Ges.*, XII, 931.)

I illustrate my process by the following examples:

First. About fourteen parts, by weight, of safranin (two molecular proportions) or about thirteen parts, by weight, of phenosafranin (two molecular proportions) are dissolved in about fourteen hundred parts, by weight, of water and diazotized with nine parts, by weight, of hydrochloric acid (21° Baumé) and 2.76 parts, by weight, of sodium nitrite ($NaNo_2$) (one hundred per cent.) in the usual manner while being cooled with ice. The diazotation is complete if the liquid assumes a pure blue and leaves on paper a blue spot. Then there is run into the diazo solution while stirring rapidly an alkaline aqueous solution of beta-naphthol sodium obtained by dissolving about three parts, by weight, of beta-naphthol (one molecular proportion) in four parts, by weight, of soda-lye, (NaOH,) (specific gravity 1.437,) and one hundred parts, by weight, of water. After about twelve to twenty-four hours the formation of the dyestuff is complete. The solution is heated with steam to 70° or 80° centigrade and filtered, if necessary. The dyestuff is then precipitated with common salt, collected on a filter, and pressed and dried at a moderate temperature. In this case the formation of the dyestuff takes place in a neutral solution. The following example illustrates the process employing a weak acid solution—for instance, an acetic-acid solution.

Second. Fourteen parts, by weight, of safranin or thirteen parts, by weight, of phenosafranin are diazotized in the manner above described. To the blue diazo solution is added a solution of seven to eight parts, by weight, of sodium acetate, and while stirring rapidly a solution of beta-naphthol sodium is run in, obtained from three parts, by weight, of beta-naphthol and two parts, by weight, of soda-lye (specific gravity 1.437) and one hundred parts, by weight, of water. The process is completed as in the first example.

Third. If the reaction is to take place in an ammoniacal solution, there is added to an alkaline beta-naphthol solution an excess of sal-ammoniac or ammonia sulfate and run into the hydrochloric-acid solution of the diazotized safranin, as described above. The process is completed as in the two previous examples.

The dyestuff obtained by the above examples is a violet-brown crystalline powder of metallic luster soluble in water and alcohol with a blue-violet color, practically insoluble in ether and benzene, and soluble in concentrated sulfuric acid with a dirty greenish-yellow color, the solution becoming green when heated.

Having now described my invention, what I claim is—

1. The herein-described process of manufacturing blue basic dyestuffs soluble in water, which consists in combining beta-naphthol with a diazotized safranin, two molecules of the diazotized safranin and one molecule of beta-naphthol being employed, substantially as set forth.

2. As a new product, the compound obtained by combining beta-naphthol with diazotized safranin, while employing one molecule of beta-naphthol to two molecules of safranin, being a violet-brown crystalline powder of metallic luster, soluble in water and alcohol with a blue-violet color, practically insoluble in benzene and ether, soluble in concentrated sulfuric acid with a dirty greenish-yellow color, the solution becoming green when heated, substantially as set forth.

In testimony that I claim the foregoing as my invention I have signed my name in presence of two subscribing witnesses.

BENNO HOMOLKA.

Witnesses:
BERNHARD LEYDECKER,
WILHELM SCHAAB.